United States Patent [19]
Finzel et al.

[11] Patent Number: 5,879,109
[45] Date of Patent: Mar. 9, 1999

[54] PROCESS AND APPARATUS FOR INTRODUCING AN OPTICAL OR ELECTRICAL CABLE INTO SOLID GROUND

[75] Inventors: Lothar Finzel, Unterschleissheim; Heinz Diermeier, Munich; Peter Dotzer, Hoehenrain; Ernst Mayr, Starnberg, all of Germany

[73] Assignee: Siemens Aktiengesellschaft, Munich, Germany

[21] Appl. No.: 21,272

[22] Filed: Feb. 10, 1998

[30] Foreign Application Priority Data

Feb. 20, 1997 [DE] Germany ............... 197 06 791.3

[51] Int. Cl.⁶ .................................................. F16L 1/00
[52] U.S. Cl. .................. 405/174; 405/154; 405/156; 405/174; 405/131; 138/105
[58] Field of Search ...................... 405/174–183, 405/155, 156, 131, 128; 219/213; 588/252; 299/14; 175/16; 404/77, 79, 89, 95; 138/105

[56] References Cited

U.S. PATENT DOCUMENTS

| | | | |
|---|---|---|---|
| 620,402 | 2/1899 | Anderson | 405/131 |
| 3,245,721 | 4/1966 | Margiloff | 299/14 |
| 3,251,975 | 5/1966 | Hugenholtz | 405/131 X |
| 3,300,253 | 1/1967 | Hylak | 299/14 |
| 3,493,060 | 2/1970 | Van Dyk | 299/14 X |
| 3,596,995 | 8/1971 | Fitzgerald | 299/14 |
| 3,656,306 | 4/1972 | Thorpe | 405/131 |
| 3,788,703 | 1/1974 | Thorpe | 299/14 |
| 3,790,687 | 2/1974 | Wright | 405/174 X |
| 3,986,280 | 10/1976 | Johnson | 405/174 X |
| 4,034,567 | 7/1977 | Roggen | 299/14 X |
| 4,376,598 | 3/1983 | Brouns et al. | 405/174 X |
| 4,507,012 | 3/1985 | Corcoran et al. | |
| 5,003,144 | 3/1991 | Lindroth et al. | 299/14 X |
| 5,174,685 | 12/1992 | Buchanan | 405/174 X |

FOREIGN PATENT DOCUMENTS

| | | |
|---|---|---|
| 37 20 556 | 1/1988 | Germany . |
| 38 28 595 | 4/1991 | Germany . |
| 42 01 984 | 7/1993 | Germany . |
| 0599020 | 3/1978 | Russian Federation ............. 299/14 |
| 0702128 | 12/1979 | Russian Federation ............. 299/14 |

*Primary Examiner*—Dennis L. Taylor
*Attorney, Agent, or Firm*—Hill & Simpson

[57] ABSTRACT

A process and apparatus for introducing a cable into a channel, which is formed into a heated surface of solid ground, such as asphalt, displaces the material to form a channel, inserts the cable and then reintroduces the displaced material back into the channel to refill the channel.

29 Claims, 3 Drawing Sheets

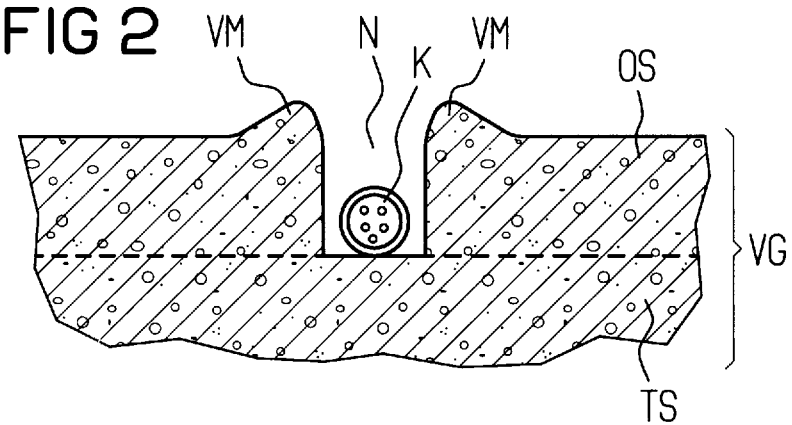
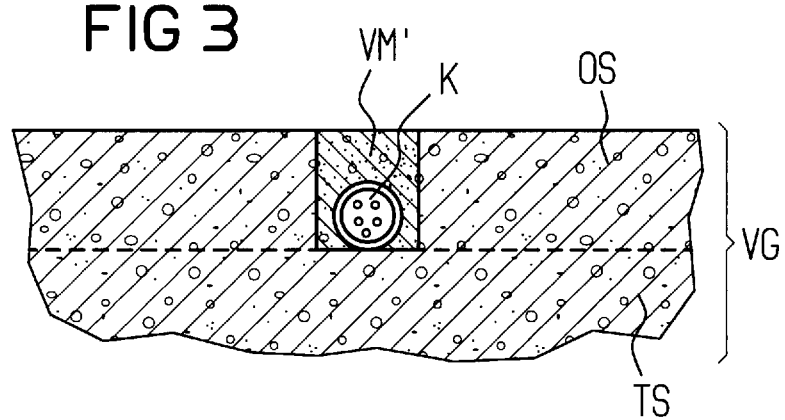

PROCESS AND APPARATUS FOR INTRODUCING AN OPTICAL OR ELECTRICAL CABLE INTO SOLID GROUND

BACKGROUND OF THE INVENTION

The present invention is directed to both a process and an apparatus for introducing either an optical cable or an electrical cable, which comprises a homogeneous pressurized-water-tight tube and either the optical or electrical conductors in the tube, into solid ground.

It is known that cables, in particular micro-cables which comprise a tube with optical waveguides running loosely therein, are laid in solid ground. For this purpose, channels are cut into the structure of a road, footpath or cyclepath and the cable is laid in this channel, fixed therein and covered by an appropriate filling material for protection purposes. However, the production of channels in solid ground, such as concrete or asphalt, by a cutting operation with the aid of a corresponding cutting machine involves relatively high cost, since it is necessary to go to considerable lengths to dispose of the material that is removed during the cutting operation. Moreover, there is considerable harm to the environment as a result of the dust formation. Another disadvantage of this particular type of process, which uses a channel cut deep into the basic structure of the solid ground, such as that of a road, is that in some circumstances, a "predetermined breaking point" is created. It is, thus, necessary to ensure that, as far as possible, a base course or layer of the road is not damaged.

SUMMARY OF THE INVENTION

The object of the present invention is to find a process and apparatus for laying cables in channels of solid ground in the case of which, on one hand, the cable is sufficiently protected against damage but, on the other hand, the base course or layer of the solid ground is not weakened. The intention is for the channel to be produced, as far as possible, in a straightforward and environmentally-friendly manner. The set object is achieved, then, according to the present invention, by a process and apparatus, wherein heating units are used to heat the ground surface until the latter is softened, then a channel-forming unit is used to introduce a channel into the heated ground by virtue of displacing the ground material, which ground material is displaced upward to the ground surface to form a ridge alongside at least one of the channel borders, then a laying unit is used to introduce the optical or electrical cable into the channel, followed by a filling unit which is used to reintroduce the displaced ground material back into the channel, on top of the cable, which had been inserted therein, and in that a rolling unit is used to compact the ground material which has been reintroduced into the channel and to level it relative to the surface of the ground.

Advantageously, the process, according to the invention, is that the channel, which is necessary for the operation of laying the cable is introduced into the wearing or upper layer of the ground rather than, as has been the case up until now, in the base course or support layer of the ground as well. In this way, the base course or layer remains undamaged and there is no longer any risk of crack formation. In addition, it is not necessary for the channel to have clearly-defined channel borders, as are produced during a cutting operation, and this has the advantage that the material which is introduced at a later stage for the purpose of refilling the channel will bond more easily with the original structure. The invention then forms a channel by virtue of the upper or wear layer of the ground being displaced and the material which is broken up or displaced during the formation of the channel is brought to the ground surface, where it forms a ridge along at least one longitudinal border of the channel. During the formation of the channel, a counterpressure is expediently produced from above with the aid of supporting elements on both sides of the resulting channel, and this counterpressure prevents the channel from being excavated too far to the sides. Stabilization of the excavated ground material prevents the material from moving away in an undesirable manner or from sliding back into the channel which is being formed. Once the channel has been formed, the cable or the tube of the cable is immediately laid in the base of the channel. Thereafter, the ground material which has been displaced and deposited at the sides is then reintroduced into the channel on top of the cable which has been laid therein and compacted by an appropriate rolling unit. Any air inclusions, cavities, irregularities or locations where there is a lack of material are closed off with a filler, for example a filler selected from a group consisting of bitumen, epoxy, and granules of ground material. This means that such a mechanically strong cable, in particular a micro-cable, is laid in solid ground, for example a road, so as to be water-tight over its length. A continuous frost-proof road surface is then restored as a result of the process. This makes it possible to dispense, with the use of hot bitumen as a filler and sealant, which has been necessary in the case of previous processes. It is also the case that the process according to the invention does not involve any abrasion dust which has to be disposed of or removed. Moreover, the original ground structure is maintained. The surface, appearance, strength and loading capacity of the ground surface are not changed in any way. The channel for the operation of laying the cable is introduced only in the wearing course or upper surface course of the ground, for example in the wearing course of an asphalt road with a depth of approximately 2 cm to 3 cm, at most, to the depth of the thickness of the top course of the ground. This channel depth is fully sufficient for reliable laying of the micro-cable, which has a tube with an external diameter of about 2 mm to 15 mm. The optical waveguides of this micro-cable are introduced into the interior of the tube either before or after the tube is laid. After the laying operation, the ground material which has been reintroduced, rolled in and compacted provides the cable itself with sufficient protection from above against mechanical loading and damage.

The channel is produced by virtue of the ground material being displaced with the aid of appropriate channel-forming units, which are forced or pressed into the ground material, which has already been preheated by heating elements. In this case, the ground material which has been displaced and also, possibly, broken-up is brought from the channel which has been formed to the road surface where it is "thrown up" in a ridge-like manner. If the grain size of the ground filler is too large for the broken-up ground material to be displaced to the road surface, the channel-forming unit may, if required, be made to vibrate vertically. In this case, relatively large pieces of rock or filling material are then crushed. Moreover, the vibration assists the flow behavior of the ground material. Additionally, horizontal vibrations may reduce the friction between the pressing-in tool of the channel-forming unit and the channel walls. For the purpose of creating the vibrations, a plurality of synchronously-running eccentric discs may be mounted on the frame of the channel-forming unit.

However, the necessary channel may also, according to the present invention, be introduced in the heated ground with the aid of a carriage, in the case of which, for example, an oscillating runner is pressed under high pressure and drawn in the direction of travel. Such a process would correspond approximately to a plowing operation. However, it is also possible to use a reciprocating ram which forces depressions into the ground from above at a very high frequency. This makes it possible, with minimal pressing-in pressure, for any type of channel shape, bores and also changes the channel direction with very small radius to be forced into the ground surface with the ground material likewise being displaced upward in each case.

It is advantageous if all of the units of the individual process steps are combined, preferably by couplings, to form a complete laying and pressing-in unit, which can then be moved by self-propulsion or traction along the cable-laying route in the operating direction. Such a laying and pressing-in unit comprises the following functions:

heating the ground surface with the aid of one or more heating units;

introducing the channel with the aid of a channel-forming unit;

introducing cable into the channel and holding the cable down with the aid of a laying unit;

filling the channel with the aid of a filling unit with ground material which has been displaced and deposited on the sides of the channel; and then restoring the ground surface with the aid of a rolling unit.

The successive process steps are explained in more detail as follows.

First of all, the ground surface is cleaned with the aid of a sweeping machine, for example with a conventional road sweeper. However, such a road sweeper could also be integrated in the laying and pressing-in unit. An appropriate suction-extraction machine disposes of the dirt which has been picked up from the street, with the result that the channel which is to be produced is not contaminated by this dirt.

The ground surface is then heated with the aid of heating units in the region of the channel which is to be produced, so that the ground material, for example the asphalt surface, softens. This heating operation, however, has to take place gradually, since, with excessive heating, the material may be damaged in some circumstances. Use is thus made, for example, of heating pads, which are known in road construction and are used for repair work when the surface course of the road, rather than being cut away, is merely intended to be heated and consolidated again by rolling. These heating pads are heated by a propane gas flame and have dimensions of approximately 1×1 meter or 2×2 meters. For the heating unit according to the present invention, for example, a plurality of heating elements are arranged in a row, one behind the other, up to a length of approximately 10 m. The ground surface is heated gradually thereby and, for the production of the channel, it is possible to reach an advancement rate of up to 3 km/hour. For this purpose, the width of these heating elements is expediently from 0.3 m to 0.5 m. The heating elements of this heating unit run on rollers and are connected to one another, for example, by couplings. As a result, the entire heating unit is steerable and, if required, it can follow a turn. However, it is also possible for the heating unit to be kept shorter if, for example, the channel-forming unit is heated in addition to the heating of the ground or road surface by the heating elements.

Once the top course or upper surface of the ground has been heated sufficiently to the depth of the channel which is to be produced, the channel-forming unit is lowered or inserted. This channel-forming unit may be designed as a roller-type or carriage-type tool. The roller-type embodiment comprises one or more rollers arranged one behind the other to form a rolling arrangement. The diameter and thickness of the rollers are graduated in order that the operations of making the channel wider and deeper take place gradually. The entire channel-forming unit can be lowered, preferably by hydraulic mechanisms. In principle, the rollers do not have to be driven, heated or made to vibrate, but such additions can be retrofitted, if required, for the special functions or special cases. Thus, it is also possible to make use of a channel-forming unit which can produce a plurality of channels one beside the other at the same time. For the normal service-life requirement, the rollers are produced from case-hardened steel. For more stringent requirements, for example with a high proportion of rock in the ground, it is also possible to use hard-metal rollers, which may include Tungsten carbide rollers, cemented carbide rollers or sintered carbide rollers.

The roller arrangement is configured so that it can be exchanged easily and quickly if required. If a plurality of rollers are combined one behind the other to form a roller arrangement, then the shape of the rollers is such that the first roller penetrates slightly into the ground surface by a wedging action. In contrast, the flanks of the last roller are approximately right-angled in order to form a precise channel flank. The rollers may be, for example, of a rectangular cross section or at least partially conical or tapering cross section at the circumferential edge to form a wedge-like pressing surface.

During production of the channel using a roller-type tool of the kind described, the channel border may crack in an undefined manner. This is to be expected, particularly in the case of relatively old, damaged road surfaces. In order, however, to obtain a defined channel width, it is expedient for supporting elements, for example in the form of supporting rollers, to be arranged on both sides of the channel-forming unit. These supporting elements act from above on the ground surface as the channel is being formed in the ground surface and, thus, prevent any further cracking of the surface at the sides of the channel. It is also expedient using these supporting elements, or an additional forming unit, for the ground material which has been displaced from the channel formed to be stabilized temporarily along the channel borders until refilling takes place, in order to prevent backsliding.

Immediately after the channel-forming unit has formed the channel, a laying unit is used to introduce the optical or electrical cable into the channel. To be precise, the microcable is drawn off from the accompanying cable drum and is introduced into the channel. A cable guide ensures that the cable is guided in a defined manner and an accompanying roller holds down the cable in the base or bottom of the channel. Immediately before and/or after the cable is introduced into the channel, it is possible for the channel walls to be provided with an appropriate adhesion promoter, for example a primer, for improving adhesion and, in some circumstances, with a liquid bitumen as an adhesive and a binder for the filling material which is to be reintroduced.

Once the cable has been introduced in the channel, the ground material which has been deposited or displaced along at least one channel border is brought together by a filling unit, for example by a funnel-like scraping element or collector, and brought into the channel. A rolling means in the form of compacting rollers which will roll the ridges of material back into the channel and compact this material can also be utilized.

Once the channel has been refilled and the ground material which has been introduced is compacted by the compacting rollers, the ground surface, for example the road surface, can be restored. For a fine-grain surface, it is possible for the top side of the channel to be mixed with granules, for example consisting of ground material such as asphalt. If the volume of the broken-up ground material is not sufficient for filling the channel, it is also possible, in addition, to introduce a filler, rolled bitumen or granules together with bitumen or an adhesive. Any cavities can be sealed by binders, such as bitumen or epoxy. Using a following leveling roller, the channel surface is leveled off with the ground surface.

This concludes the laying operation using the process according to the invention.

It is expedient to combine the individual units to form a complete pressing-in and laying unit, with the result that the combined unit can be transported, for example, on a low loader. For any transportation overseas, the functional units can be uncoupled and shipped individually in units, for example in standard containers.

Overall, the process according to the present invention provides considerable advantages in comparison with the prior art. Producing the channel by displacement operation, rolling-in operation or by breaking up the wearing or upper course of the ground can be achieved with very quick laying rates, for example up to 30 m per minute. This is a considerably higher laying rate than in the case of the process which uses joint cutters. The novel process can, thus, be used to lay from approximately 20 km to 30 km of a cable, for example a micro-cable, in one day. It is also advantageous that the heat, which is used for heating up the ground surface, is available as residual heat in order, once the cable has been laid, for the material which has been displaced and deposited as a ridge to be rolled back into the channel, and this residual heat is sufficient for compacting the reintroduced material to a desired extent.

In addition, it is of no consequence as to whether, in the case of the process according to the present invention, the sides of the channel produced are smooth and regular. It is even the case that the irregularities which are produced during the breaking-up operation for forming the channel have a favorable effect, since the irregularities bond well with the reintroduced ground material. In addition, there is no need for any device for holding down the laid cable, since the operations of filling the channel and compacting the introduced material take place immediately after the cable has been inserted in the channel. It is also advantageous that the ground material which has been displaced and removed is deposited and stabilized at the sides along the longitudinal borders and that the forming unit serves at the same time to support the ground in the upward direction at the sides in order that any further, undesired cracking of the surface at the sides is prevented. Up until now, the grooves have been sealed with hot bitumen, but this is not necessary in this process. The design of the cable, having a tube as an outer sheath, makes it possible for the radial pressure to be absorbed in full. It is also possible for reinforcements, which further enhance the strength, to be rolled in together with the cable. For changes in direction, it is possible for arcuate formations to be pressed into the ground surface and these formations have to be designed so that they do not exceed the minimum permissible bending radius of the cable. Moreover, the laying operation can be carried out irrespective of the weather.

The process according to the present invention also is very environmentally friendly, because there is no need for any waste disposal or the disposal of rubble or excavated material. Moreover, the original road structure is not changed. In particular, there is no intervention in the base or underlying course of the ground, for example in the concrete substructure of the road. As a result, the predetermined strength of the road remains. A "predetermined breaking point" for the beginning of cracks in the base course of the ground, as is produced in some circumstances in cutting, is not produced by the present invention. Since, for the purpose of forming the channel, the ground material is brought to the surface at the sides, over-compaction of the roadway directly beneath the channel, as is the case with other processes, is avoided. It is also advantageous that the temperature of about 80° C. to 120° C., which are required for the laying operation, are far below those which are used for filling with hot bitumen, which is usually applied at a temperature of about 260° C. Moreover, since the cutting noise is eliminated, the laying operation takes place with considerably less energy consumption and a considerably reduced level of noise.

This laying method can also be used for roadway renewal when the roadway surface is reinforced with glass-fiber mats or when roadway markings or roadway reinforcements are rolled on at the side of the roadway. It is then possible for fibers to be incorporated directly in the glass-fiber mats or the sides of the roadway. As binders and filling materials, it is also possible to use, in addition to bitumen, thermosetting epoxy, which can be provided with color in order to be seen more clearly.

The cable can also be more easily concealed, since it is embedded at a smaller depth and is only concealed by a thin covering. Even for the concealing operation, there is no special waste which has to be separately disposed of or carried away. It is also advantageous that the bitumen of an asphalt surface is not subjected to any thermal damage during the gradual heat-up operation before the channel is formed therein.

The machine for laying a cable by this process also has particular advantages since the operations of pressing in, laying the cable, filling and consolidating take place one after the other. It is expedient for the road surface to be cleaned before the operation of pressing-in or forming the channel, the dust being disposed of via a suction-extraction machine or vacuum-type sweeper in this case. The channel-forming unit with its roller arrangement may be lowered hydraulically, as a result of which the channel depth can be adjusted in a stepless manner. The diameters and widths of the rollers are graduated with respect to one another, with the result that the operations of making the channel deeper and wider take place gradually. The shape of the flanks of the roller widens as the number of rollers increases. Moreover, the roller shape can be adapted to the desired shape of the channel. In the case of wear or a different roadway composition, the rollers of the roller arrangement can be exchanged easily. The ground material is treated particularly carefully as a result of the gradual heating in a long, narrow heating zone. The heating unit used is steerable, with the result that it can thus follow a turn. The heating unit is expediently extended in accordance with the requirements by heating pads which are arranged in a row. The complete pressing-in and laying unit is expediently self-propelled and, thus, can have further functional units coupled to it.

The process according to the present invention also achieves a channel between the cable and the cable wall which is water-tight over its length, with the result that moisture is reduced and the cavities are minimized. As a result, the entire region is less susceptible to frost. If required, use may be made of bitumen or other filling means and binders which produce an additional bond between the channel border and the reintroduced ground or road material. Overall, good mechanical strength of the refilled channel is achieved by "wedging" of the reintroduced ground material in the channel wall. In this case, the cable is guided by way of the uniformly surrounding material and is fixed to a sufficient extent even in the event of temperature fluctuations, with the result that it cannot "rise up". The pressing-in operation can be facilitated, in addition, by an overlaid vibration plate. Moreover, the shape of the rollers of the filling unit is selected so that the displaced ground material is held together, the surface does not crack and the broken-up ground material can be rolled directly into the channel. The adhesion to the channel wall can be increased by the addition of a primer. If, finally, the tube of the laid cable is enclosed by a polyethylene sheath, the possibly required operation of lifting the cable is simplified, since bitumen or primer do not adhere particularly well to this sheath.

Other advantages and features of the invention will be readily apparent from the following description of the preferred embodiments, the drawings and claims.

BRIEF DESCRIPTION OF THE DRAWINGS

FIG. 2 is a cross sectional view of a pressed-in channel in the open state with the cable already laid therein;

FIG. 3 is a cross sectional view of the channel of FIG. 2 with the cable laid in once the material has been reintroduced therein;

DESCRIPTION OF THE PREFERRED EMBODIMENTS

Figure 1:
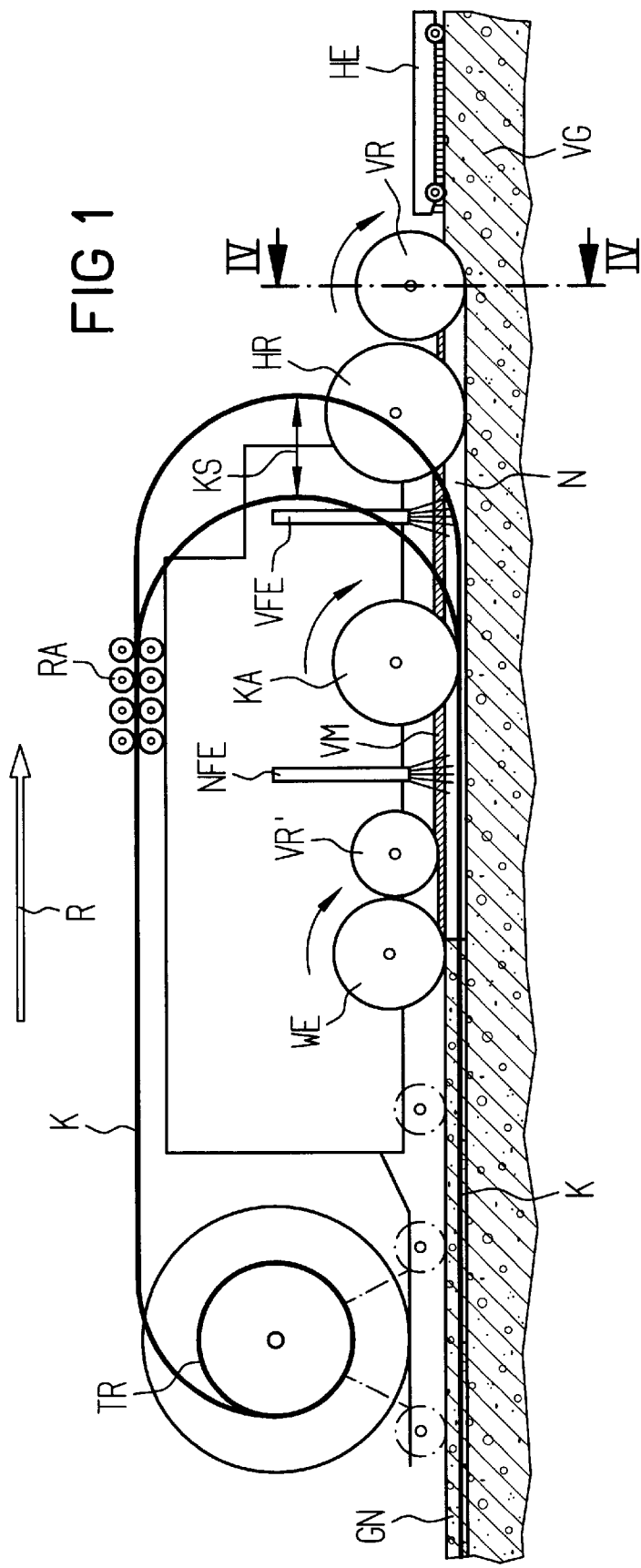
FIG. 1 is a basic schematic arrangement of a laying and pressing-in unit according to the present invention.

The principles of the present invention are particularly useful when incorporated in a basic structure of a laying and pressing-in unit, which is illustrated in FIG. 1. Expediently, the machine includes a heating unit HE, which is independent and can be coupled to the rest of the units in a straightforward manner. The heating unit HE is used to heat the ground VG in the region where the channel is to be produced until the ground becomes softened. Once the softening temperature has been reached for the ground material, such as asphalt, the channel-forming unit acts on the heated ground, for example, by way of the roller arrangement comprising a preliminary roller VR, which is of a smaller diameter than a main roller HR of a larger diameter, so as to form a channel N. The heated ground VG is displaced in this way and, thus, forms to the side of the rollers VR and VH ridges FM (see FIG. 2), which are displaced ground material and extend along the longitudinal borders of the channel N.

After the channel N has been formed, a roller pull-off or caterpillar pull-off RA is used to draw off a cable K, which is to be laid, from the accompanying cable drum TR, and this cable K is laid in the open channel N with the aid of a cable pressure-exerting roller KA. A pre-filling means VFE expediently introduces an adhesion promoter into the channel before the cable K is introduced so as to improve the adhesion in the channel base. After the cable K is introduced, it is also expedient for a second filling means NFE likewise to introduce an adhesion promoter, for example a primer or bitumen, in order to improve the adhesion of the filling material which will then follow.

It can also be seen in FIGS. 1 and 2 that the displaced ground material VM is deposited as a ridge along the open channel N and extends above the ground surface. Following this, a filling means is used to close off the channel N, to be precise using the ground material which has been displaced and thrown up on the sides as the ridges VM. This takes place by displacement of the ridges using the appropriate compacting rollers VR' or a wedge-shaped blade or the like for forcing the ground material VM back into the channel. Finally, a rolling unit WE is used to compact the ground material which has been reintroduced into the channel N and to level this material off with the rest of the ground surface. The final result is the filled channel GN with the cable K therein. In the region where the cable is drawn in, a certain cable excess forms a so-called cable store KS, which compensates for the irregularities and tolerances as the laying unit progresses. For reasons of clarity, the arrow R also indicates the laying direction and movement of the unit.

As illustrated in FIG. 2, a channel N, which has been introduced into the top course or surface course OS of the ground VG using the laying unit according to the invention, does not extend into the base course TS, which may be of a concrete, remains undamaged. FIG. 2 also shows clearly that the operation of the pressing in or forcing in the channel N produces accumulations of displaced material along the side borders, and these accumulations extend along the channel border as the ridges of displaced material VM. This illustration shows that the cable K, in particular, is a micro-cable having a tube and optical waveguides running therein, which have already been introduced into the tube.

FIG. 3 illustrates that the channel N has been filled with the aid of filling, compacting and rolling units, with the ground material VM', which was displaced during the production of the channel. The filled channel with the reintroduced material has been leveled off with the ground surface by the rolling unit WE.

Figure 4:
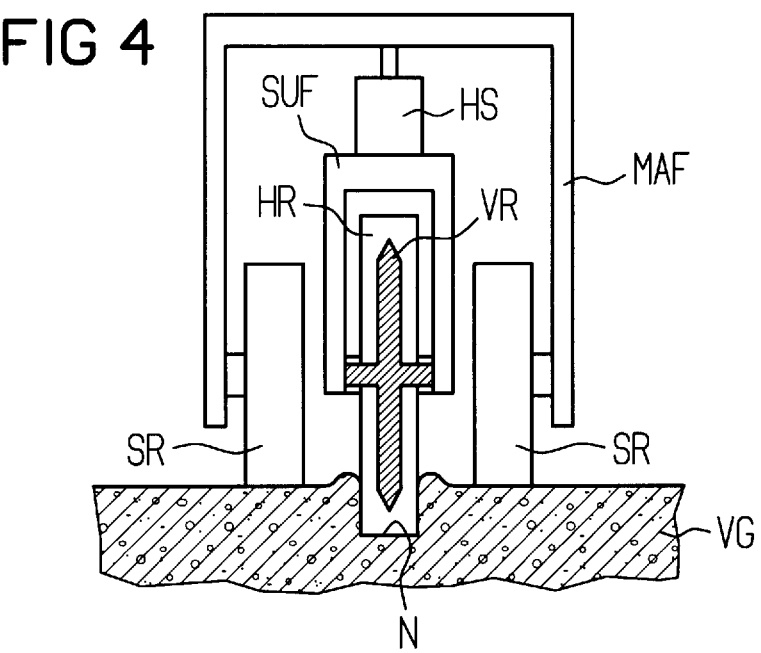
FIG. 4 is a cross sectional view taken along the lines IV—IV of FIG. 1 with side surface supporting rollers.

As mentioned hereinabove, the leading roller VR has a smaller diameter than the following roller HR. As shown in FIG. 4, these two rollers are supported on a sub-frame SUF, which is mounted in a main frame MAF by a hydraulic suspension HS. Thus, the sub-frame can be adjusted relative to the main frame to control the depth of the channel-forming unit. Also, as shown in FIG. 4, support members, such as supporting rollers SR, are positioned on each side of the rollers VR and HR to engage the ground surface and to control the displacement of the material during the forming of the channel. Finally, FIG. 4 shows that the roller HR, in addition to having a greater diameter than the roller VR, has a greater thickness and has a rectangular cross section, whereas the roller VR is thinner and has a conical edge to form a wedge-shaped edge for initiating the formation of the channel.

Figure 5:
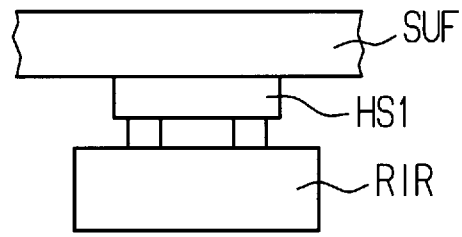
FIG. 5 is a partial side view of an embodiment of a channel-forming arrangement.

In FIG. 5, a modification of the channel-forming unit is illustrated. In this arrangement, a reciprocating ram RIR is mounted on the sub-frame SUF and is reciprocated by a hydraulic unit HS1.

Figure 6:
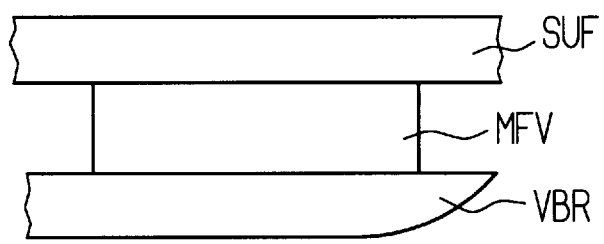
FIG. 6 is a partial side view of another embodiment of a channel-forming arrangement.

In FIG. 6, a vibrating runner VBR is mounted on the sub-frame SUF by means for vibrating MFV, which can vibrate both in a vertical and in a horizontal direction. Both the runner VBR and the reciprocating ram RIR can have a wedge-shaped portion at the leading end which extends into a flat bottom portion at the trailing end of the member so that a flat bottom channel N of FIG. 2 can be formed.

Although various minor modifications may be suggested by those versed in the art, it should be understood that we wish to embody within the scope of the patent granted hereon all such modifications as reasonably and properly come within the scope of our contribution to the art.

We claim:

1. A process for introducing a cable, which comprises a homogeneous and pressurized-water-tight tube and conductors selected from a group consisting of optical and electrical conductors, into solid ground, said process comprising the steps of heating a ground surface until it softens with a heating unit, forming a channel into the heated ground by displacing the ground material upward onto the surface of the ground to form at least a ridge along one channel border by a channel-forming unit, introducing cable into the formed channel, then reintroducing the displaced ground material into the channel on top of the cable which has been introduced therein by a filling unit, and compacting the ground material which has been reintroduced into the channel with a rolling unit.

2. A process according to claim 1, which includes stabilizing the displaced ground material along the channel during the step of forming the channel.

3. A process according to claim 1, wherein the step of compacting the ground material with the rolling unit levels the reintroduced ground material with the ground surface adjacent the channel.

4. A process according to claim 1, which includes, during the step of reintroducing the ground material, adding a filler selected from a group consisting of epoxy, bitumen and granules of ground material to compensate for the lack of material for the channel.

5. A process according to claim 1, which includes, during the step of forming the channel, vibrating the channel-forming unit vertically.

6. A process according to claim 1, wherein the step of displacing the ground material to form the channel uses a channel-forming unit which has a roller arrangement comprising at least one channel-forming roller.

7. A process according to claim 1, wherein the step of displacing the ground material by a channel-forming unit utilizes a carriage with an oscillating runner for the channel-forming purpose.

8. A process according to claim 1, wherein the step of displacing the ground material by a channel-forming unit uses a ram which vibrates at a high frequency.

9. A process according to claim 1, wherein the step of heating the ground material performs the heating in a stepwise manner utilizing a plurality of individual heating units, one disposed behind the other.

10. A process according to claim 1, which includes heating the channel-forming unit.

11. A process according to claim 1, wherein the step of displacing the ground material with a channel-forming unit utilizes a channel-forming unit having a plurality of rollers which are guided one behind the other and are of a different size.

12. A process according to claim 1, which includes adjusting the vertical position of the cable laying unit, the channel-forming unit and the rolling unit hydraulically.

13. A process according to claim 1, which includes, during the step of displacing the material to form the channel, applying supporting rollers to support the ground surface of the channel borders to prevent cracking.

14. A process according to claim 1, wherein the step of drawing off the cable from a cable drum and introducing it into the channel includes holding the cable in the channel until the ground material has been displaced and reintroduced into the channel on top of the cable.

15. A process according to claim 1, which includes providing an adhesion-promoter selected from a primer and bitumen into the channel between the steps of forming the channel and reintroducing the displaced material back into the channel.

16. A process according to claim 1, wherein the ground material which has been displaced and deposited along the sides of the channel is brought together in the filling unit by a collector, which preferably is formed by a member which urges the material back into the channel and includes compacting rollers.

17. A process according to claim 1, wherein all of the units are combined via couplings to form a complete laying and pressing-in unit to move as a unit along the cable laying route.

18. A process according to claim 1, wherein a channel for receiving the cable is introduced into the top of an asphalt course of the ground material.

19. A process according to claim 1, wherein the step of introducing the cable introduces a tube having an external diameter in a range of 2 mm to 15 mm and contains optical waveguides.

20. A process according to claim 1, wherein the step of forming the channel forms a channel with a depth in a range of 2 cm to 3 cm up to the depth of the total thickness of a top course.

21. A process according to claim 1, wherein the step of introducing the cable includes drawing the cable from an accompanying cable drum by a pull-off arrangement with excess storage between the pull-off arrangement and a hold-down device of the cable insertion unit.

22. An apparatus for forming a channel and introducing a cable therein, said apparatus comprising means for heating the ground surface in the region of the channel including at least one heating unit, means for forming a channel in the heated ground material, means for drawing off a cable from a cable drum and introducing the cable into a channel and holding the cable therein, means for introducing displaced ground material back into the channel to cover the cable, and means for compacting and closing off the channel with the previously displaced ground material.

23. An apparatus according to claim 22, wherein the means for forming a channel comprises at least one roller mounted in a lowerable roller arrangement.

24. An apparatus according to claim 23, wherein at least one of the rollers has a rectangular cross section.

25. An apparatus according to claim 23, wherein at least one of the rollers has a cross section tapering to a wedge shape adjacent the periphery.

26. An apparatus according to claim 22, wherein the means for forming a channel includes at least one vibrating carriage runner for forming the channel.

27. An apparatus according to claim 22, which includes means for storing excess cable being disposed between a means for pulling the cable from a cable drum and the point of introducing the cable into the channel.

28. An apparatus according to claim 22, wherein each of the means are formed as individual functional units which are separated from one another and connected to one another via couplings.

29. An apparatus according to claim 22, wherein at least the means for forming the channel, the means for pulling a cable from a cable reel and introducing it into the channel and the means for reintroducing the material into the channel and compacting and closing off the channel are formed in a single unit.

* * * * *